(12) United States Patent
Linnartz

(10) Patent No.: US 6,570,996 B1
(45) Date of Patent: May 27, 2003

(54) WATERMARKING AN INFORMATIONAL SIGNAL

(75) Inventor: Johan P. M. G. Linnartz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/146,022

(22) Filed: Sep. 2, 1998

(30) Foreign Application Priority Data

Sep. 2, 1997 (EP) .............................. 97202700

(51) Int. Cl.[7] ................................ G06K 9/00
(52) U.S. Cl. ........................... 382/100; 725/20
(58) Field of Search ................ 380/4, 10, 54, 380/3, 23, 55; 382/100, 155, 232, 276–278, 233; 283/73, 113, 17

(56) References Cited

U.S. PATENT DOCUMENTS 5,915,027 A * 6/1999 Cox et al. ............... 380/54
5,960,081 A * 9/1999 Vynne et al. ............ 380/10

OTHER PUBLICATIONS

Wenjun Zeng and Bede Liu; "On Resolving Rightful Ownerships of Gigital Images by Invisible Watermarks"; IEEE Image Processing; International Conference Proceedings; vol. 1, 1997; pp. 552–555, Jul. 1997.*

* cited by examiner

*Primary Examiner*—Samir Ahmed
(74) *Attorney, Agent, or Firm*—Michael E. Belk

(57) ABSTRACT

A multi-bit watermark is detected in a signal (e.g. a video image) in which each bit of the multi-bit value is represented by an embedded watermark subpattern in the signal. The watermark is detected by first detecting the presence of the full watermark in the signal irrespective of its multi-bit value, and then detecting to which extent the presence of subpatterns corresponds with the multi-bit value to be checked.

5 Claims, 3 Drawing Sheets

WATERMARKING AN INFORMATIONAL SIGNAL

FIELD OF THE INVENTION

The invention relates to the field of watermarking an information signal and detecting a watermark.

BACKGROUND OF THE INVENTION

Watermarks are perceptually invisible messages embedded in information signals such as multimedia material, e.g. audio, still pictures, animations or video. Watermarks can be used to identify the copyright ownership of information. They allow a copyright owner to trace illegal copies of his material by inspecting whether his watermark is present in said copies.

Watermarks are embedded in an information signal by modifying data samples of the signal (e.g. audio samples of an audio signal, pixels of an image, transform coefficients of a transform-coded signal, etc.) such that the original is not perceptibly affected. Various methods of watermarking are known in the art. For example, pixels of an original image are slightly incremented or decremented in accordance with corresponding bits of a binary watermark pattern.

In order to detect whether an information signal has an embedded watermark, the signal is subjected to a statistical analysis. The statistical analysis yields a parameter, hereinafter referred to as "decision variable", which indicates to which extent the watermark is present in the signal. For example, if an image signal is watermarked by incrementing or decrementing its pixels in accordance with a watermark pattern, the decision variable may be the amount of correlation between the signal and an applied reference copy of the watermark. If an image is watermarked by modifying selected pixels, a prediction for said pixels is calculated from temporally or spatially adjacent pixels. The decision variable may then be the number of pixels being sufficiently different from their prediction.

Watermark detectors generate a binary output signal indicating "watermark found" or "no watermark found". That is achieved by comparing the decision variable with a predetermined threshold. If the value of the decision variable exceeds the threshold, the watermark is considered to be present in the signal. in which I is the total number of pixels.

The correlation value y is applied to a comparator 23 for comparison with a threshold value $Y_{thr}$. The comparator produces an output D=1 (watermark found) for $Y>Y_{thr}$ and an output D=0 (no watermark found) for $Y<Y_{thr}$. The watermark pattern w and the threshold value $Y_{thr}$ are carefully chosen to avoid that the detector makes too often a false decision.

FIG. 3 shows a system comprising a watermark embedder and detector in accordance with the invention. The same reference numerals are used for circuit elements which are correspond with elements which are already been shown in FIG. 1. In this example, the applied watermark w is assumed to have a 16 multi-bit values. Accordingly, the input image is divided into 16 blocks (n=16) by block-division means 11. By further block-division means 12, the watermark pattern also is divided into 16 subpatterns. A multi-bit value $w_1 \ldots w_n$ controls whether or not a subpattern is added to the image. This is illustrated in FIG. 4 in which the blank rectangles indicate that the corresponding image blocks are not watermarked. To compensate for the reduced watermark 'energy' caused by not watermarking all image blocks, other blocks are watermarked more intensively, for example by incrementing/decrementing the respective pixels by the value 2 instead of 1 as discussed before.

The watermark detector 2 now comprises partial accumulators 22.1, 22.2 . . . 22.n, one for each multi-bit value of the watermark w. Their outputs are combined in a final adding stage 24 to obtain the decision variable y which is applied to the comparator 23 which produces an output D indication of whether a watermark is or is not present, as described above. The individual outputs of the partial accumulators represent individual correlation values $y_1 \ldots y_n$. After normalization, they have a value between 0 (no correlation) and 1 (maximum amount of correlation). A subsequent evaluation circuit 25 calculates, for each correlation value, its difference relative to the corresponding one of the multi-bit watermark values to be checked and calculates the $$M = \sum_n \{w(n) - y(n)\}^2$$

sum of the squares of said differences. For example, if the watermark to be checked is a 4-bits value 1001, and the corresponding correlation values are $y_1=0.8, Y_2=0.3, Y_3=0.1$ and $y_4=0.6$, the evaluation circuit calculates $$M=(0.2)^2+(0.3)^2+(0.1)^2+(0.4)^2.$$

The result is an indication of to what extent the detected watermark resembles the given multi-bit value.

In summary, a method and an arrangement for detecting a multi-bit watermark in a signal (e.g. a video image) are disclosed. Each value of the multi-bit watermark values is represented by an embedded watermark subpattern in the signal. Instead of detecting in a conventional

OBJECT AND SUMMARY OF THE INVENTION

It is an object of the invention to provide a method and arrangement for detecting the presence of a multi-bit watermark value in the signal. It is also an object of the invention to provide a method and arrangement for accommodating such a multi-bit watermark value in images of a video signal.

This is achieved by a method in witch each of said multi-bit watermark values is represented by a respective watermark subpattern. The method comprising the steps of: determining, for each watermark subpattern, a correlation value indicating the extent to which said subpattern is present in the signal; combining said correlation values to detect whether the watermark is present in the signal irrespective of its multi-bit value; and comparing said correlation values and the corresponding bits of an applied multi-bit value to obtain an indication of to which extent the detected watermark has said applied multi-bit value.

The invention is based on the need to embed a multi-bit watermark in a signal. This is achieved by representing each multi-bit value of the watermark by a respective watermark subpattern. A straightforward method of detecting the watermark would include using a conventional watermark detector for each individual bit of the watermark by detecting the presence of the corresponding subpattern. However, as already mentioned above, detecting a watermark is a statistical analysis process which may result in false decisions. The reliability of each individual detection is weak because its signal strength is 1/nth (n is the number of bits) of the energy in the full watermark.

The inventors have recognized that is advantageous to detect the presence of the watermark irrespective of its multi-bit value at maximum reliability, and compare the (Hamming) distance between the intermediate results (i.e. the extents to which individual subpatterns are present in the signal) and the multi-bit value which is to be checked. The reliability of the multi-bit detection is now comparable to the reliability of the detection of an entire, full strength watermark.

The invention further provides a method of embedding a multi-bit watermark in a video image by adding a watermark pattern to said image, comprising the steps of: dividing the video image and said watermark pattern into blocks, the blocks of the watermark pattern constituting subpatterns; and representing each bit of the multi-bit value by adding or not adding a subpattern to the corresponding image block.

DESCRIPTION OF A PREFERRED EMBODIMENT

The invention will now be described with reference to a watermark detector in what the decision variable indicating to which extent the watermark is present in the signal is the amount of correlation between the signal being analysed and a reference copy of the watermark to be detected. However, the description should not be interpreted as restricting the invention to such an embodiment.

Figure 1:
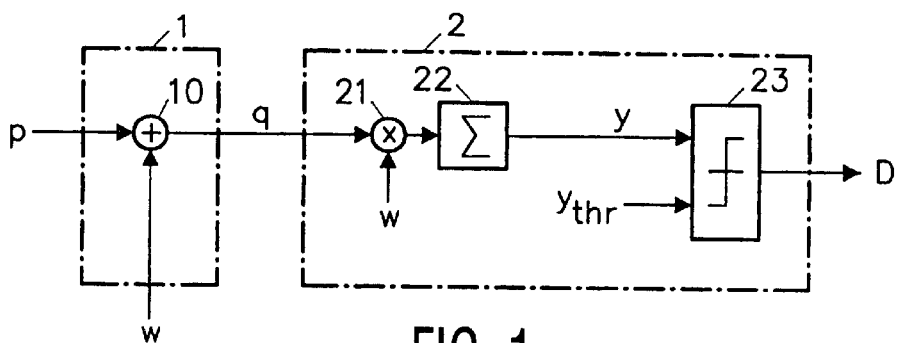
FIG. 1 shows a prior art system comprising a watermark embedder and a watermark detector.
Figure 2:
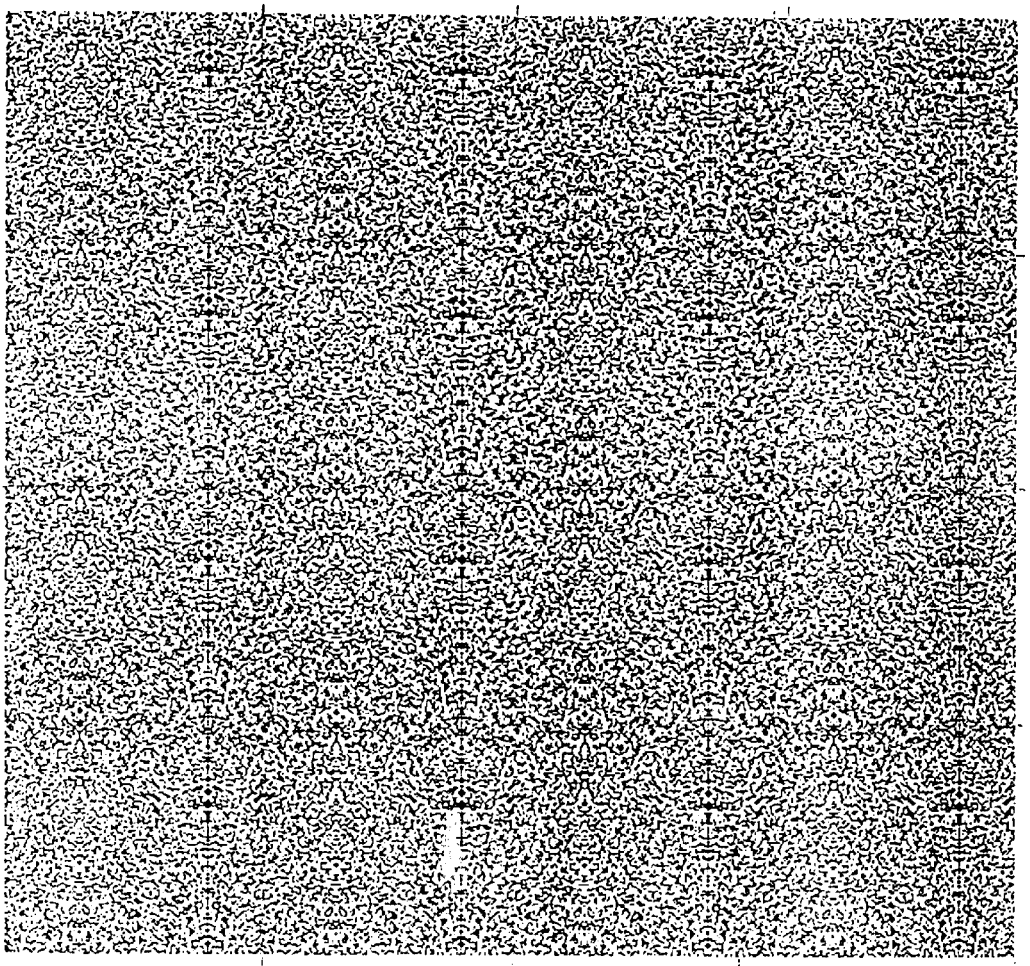
FIG. 2 shows a watermark pattern to illustrate the operation of the system which is shown in FIG. 1.
Figure 3:
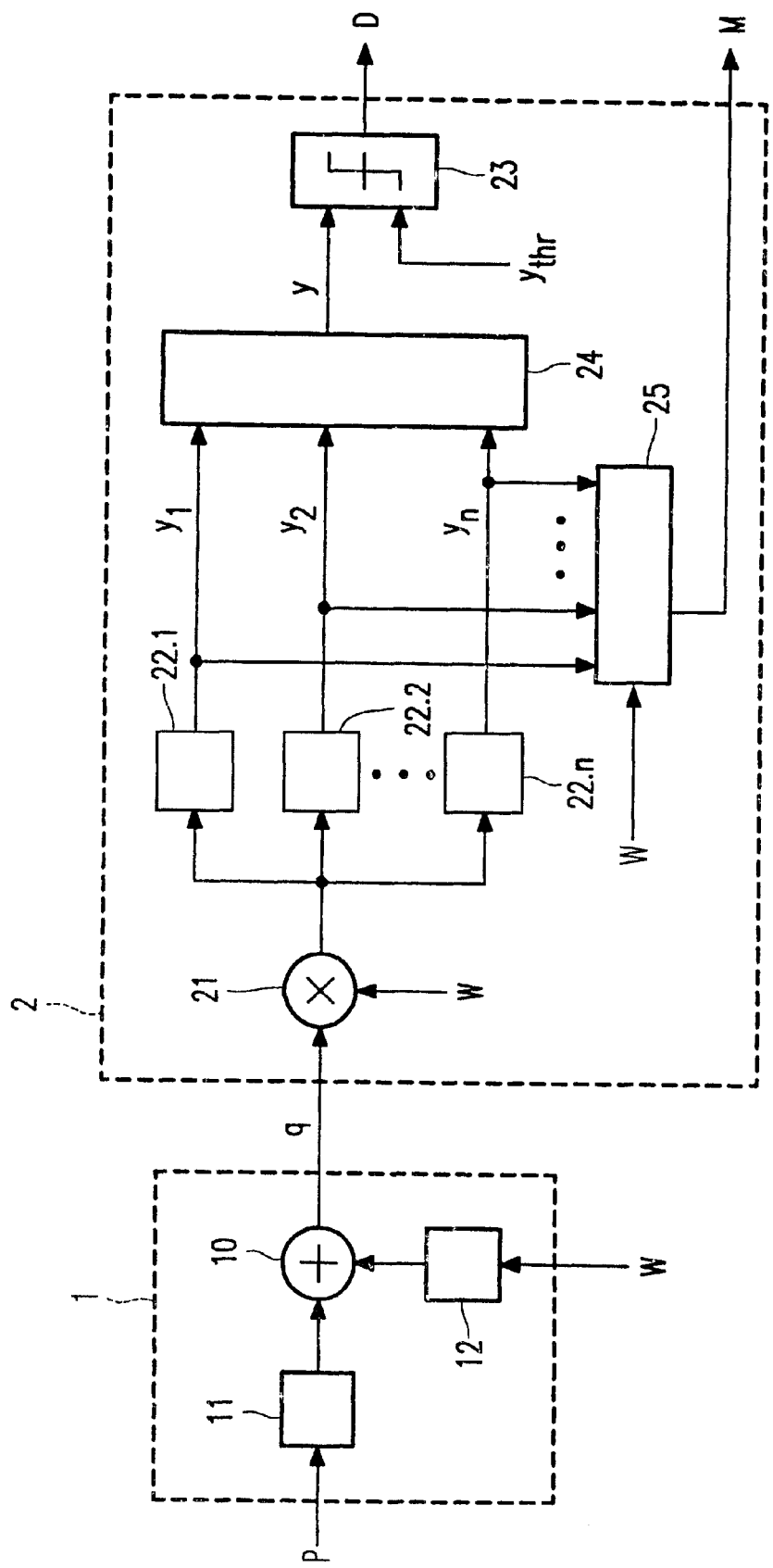
FIG. 3 shows a system comprising a watermark embedder and detector in accordance with the invention.
Figure 4:
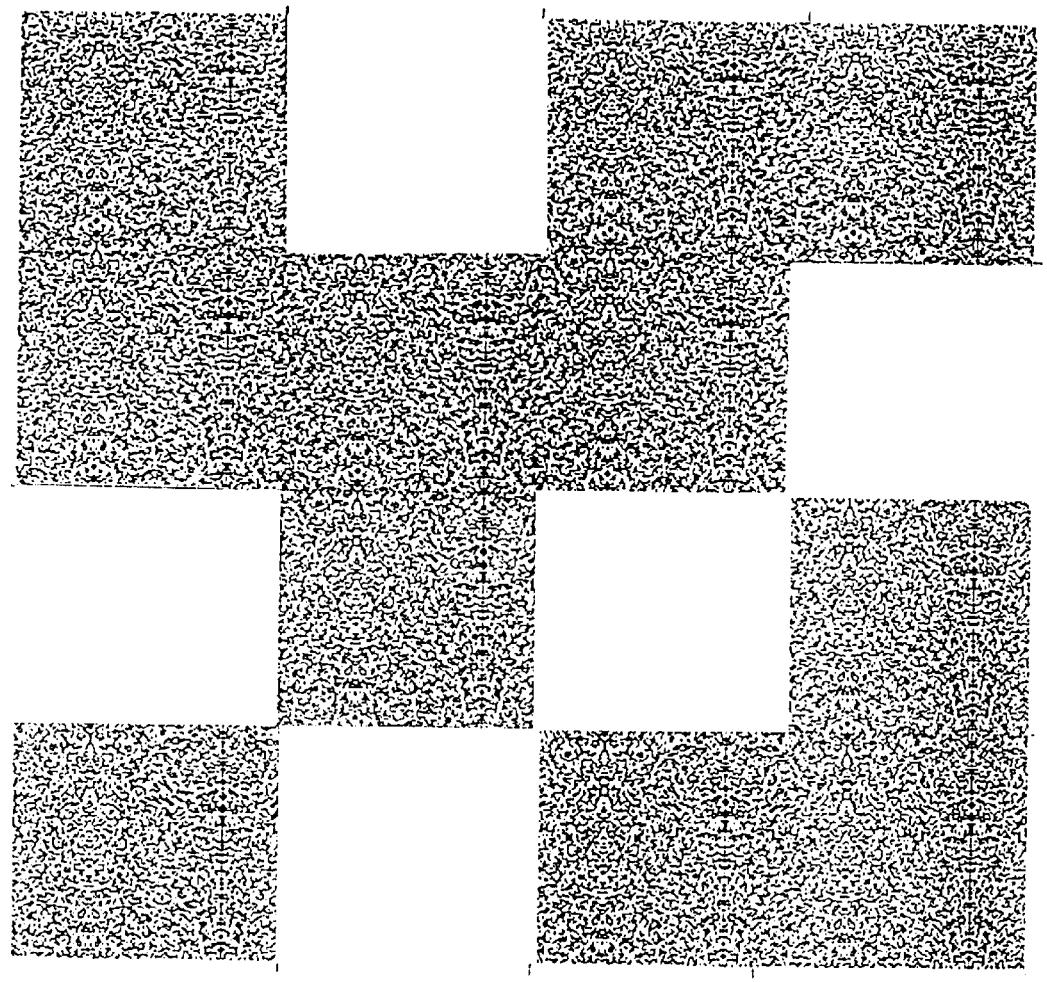
FIG. 4 shows a watermark pattern to illustrate the operation of the system which is shown in FIG. 3.

FIG. 1 shows a prior art watermark system comprising a watermark embedder 1 and a watermark detector 2. The watermark embedder receives an original information signal p and a watermark signal w. The information signal p is assumed to be a digitized image having 8-bit luminance pixel values p(i). The watermark w is assumed to be a specific binary pattern of values w(i)=1 or w(i)=−1. An example of such a watermark pattern is shown in FIG. 2 in which white and black dots represent the values w(i)=−1 and w(i)=1, respectively. The watermark embedder comprises an adding stage 10 which adds the watermark values w(i) to the spatially corresponding pixels p(i) of the input image. It will be appreciated that this does not affect the visual appearance of the image. The embedded watermark is thus perceptually invisible.

The information signal q is applied, after transmission or storage (not shown), to the watermark detector 2. The watermark detector comprises a multiplication stage 21 and a summing circuit 22 which collectively constitute a correlation circuit. The multiplication stage receives the information signal q and a reference copy of the watermark w the presence of which in the signal q is to be detected. The pixel values q(i) of the received image and the corresponding pixel values w(i) of the reference watermark are individually multiplied and then the products are summed up to obtain a decision variable y which represents the amount of correlation between input signal q and watermark w. In mathematical notation:

$$y = \sum_{i=1}^{I} w(i) \times q(i)$$

manner the presence of each individual subpattern (i.e. detecting each individual bit), the detection comprises the steps of: detecting by adder 24 and comparator 23, the presence of the full watermark in the signal irrespective of its multi-bit value, and detecting by evaluation circuit 25 to which extent the presence of subpatterns corresponds with the multi-bit value to be checked. The reliability of watermark detection is thereby improved.

What is claimed is:

1. Apparatus for detection of a watermark in an information signal, comprising:

means for receiving said information signal, said signal having therein a series of multi-bit watermark values, each such bit value representing a respective watermark subpattern;

means for determining, for each watermark subpattern, a correlation value y(n) indicative of whether or not said subpattern is present in the information signal;

means for combining the correlation values of all subpatterns to determine (D) the presence of an applied multi-bit value watermark pattern in the information signal regardless of the multi-bit value of the applied watermark pattern; and means for comparing the correlation values of all subpatterns with a corresponding bit value of the applied watermark multi-bit values to obtain an indication (M) of the extent which the multi-bit values of the detected watermark patterns corresponds to the multi-bit value of the applied watermark pattern.

2. A method of improving the reliability of detection of a watermark in an information signal, comprising the steps of:

providing a series of multi-bit watermark values w(n) in said information signal, each such bit value representing a respective watermark subpattern;

determining, for each watermark subpattern, a correlation value y(n) indicative of whether or not said subpattern is present in the information signal;

combining the correlation values of all subpatterns to detect (D) the presence of an applied multi-bit value watermark pattern in the information signal regardless of the multi-bit value of the applied watermark pattern; and comparing the correlation values of all subpatterns with a corresponding bit value of the applied watermark pattern multi-bit values to obtain an indication (M) of the extent to which the multi-bit value of the detected watermark pattern corresponds to the multi-bit value of the applied watermark pattern.

3. The method of claim 2, wherein said comparing includes calculating the sum of squares of differences between each correlation value and the corresponding bit value of the multi-bit values of the applied watermark pattern, wherein the information signal is a video image, and wherein the method further includes:

adding a watermark pattern to the image;

dividing the video image and the watermark pattern into blocks, the blocks of the watermark pattern constituting the subpatterns; and representing each bit of the multi-bit values by whether or not a subpattern of the subpatterns is added to a corresponding image block.

4. The method of claim 2, wherein the information signal represents a video image which is watermarked by adding a watermark pattern to the image, the video image and the watermark pattern being divided into blocks, the blocks of the watermark pattern constituting the subpatterns, and wherein each bit value of the watermark pattern multi-bit values represents whether or not a subpattern has been added to a corresponding image block.

5. The method of claim 2, wherein the step of comparing includes calculating the sum of squares of differences between each correlation value and a corresponding bit value of the multi-bit values of the applied watermark pattern.

* * * * *